US011484904B1

(12) United States Patent
Sports

(10) Patent No.: US 11,484,904 B1
(45) Date of Patent: Nov. 1, 2022

(54) LANDSCAPE SPRINKLER HEAD ACCESS DEVICE

(71) Applicant: Stewart G. Sports, The Villages, FL (US)

(72) Inventor: Stewart G. Sports, The Villages, FL (US)

( * ) Notice: Subject to any disclaimer, the term of this patent is extended or adjusted under 35 U.S.C. 154(b) by 0 days.

(21) Appl. No.: 17/384,072

(22) Filed: Jul. 23, 2021

(51) Int. Cl.
*B05B 15/16* (2018.01)
*A01G 25/02* (2006.01)

(52) U.S. Cl.
CPC ............... *B05B 15/16* (2018.02); *A01G 25/02* (2013.01)

(58) Field of Classification Search
CPC ................................ B05B 15/16; A01G 25/02
See application file for complete search history.

(56) References Cited

U.S. PATENT DOCUMENTS

| | | |
|---|---|---|
| D251,064 S | 2/1979 | Bergland |
| 4,781,327 A * | 11/1988 | Lawson ................ B05B 3/0481 239/203 |
| D347,259 S | 5/1994 | Fewell et al. |
| 5,938,121 A * | 8/1999 | Ferguson ................ B05B 15/74 239/203 |
| 5,996,612 A * | 12/1999 | Crawford ............ E02D 29/1409 137/364 |
| 6,494,386 B1 * | 12/2002 | Banu ....................... B05B 15/74 239/206 |
| D516,670 S | 3/2006 | Aselton |
| 8,517,286 B2 | 8/2013 | Jung |
| 8,910,723 B2 | 12/2014 | Orr et al. |
| D768,815 S | 10/2016 | Chen |
| 9,463,343 B2 | 10/2016 | Koiwa |
| D793,528 S | 8/2017 | Fuller |
| 10,369,584 B1 | 8/2019 | Leavitt |
| 2017/0095826 A1 * | 4/2017 | Schneider ............... B05B 15/16 |

* cited by examiner

*Primary Examiner* — Tuongminh N Pham
(74) *Attorney, Agent, or Firm* — Cramer Patent & Design, PLLC; Aaron R. Cramer

(57) ABSTRACT

A sprinkler head protector is a cylinder with a sleeve-style base having two differently configured caps. The first cap is a flat cap with a center hole. The second cap is a two-part split cap in the overall shape of a donut. A center opening in the first and second cap allows a sprinkler head to smoothly extend through the opening. Should repair or replacement of the sprinkler head be desired, either cap is removed thereby facilitating replacement of the sprinkler head.

16 Claims, 5 Drawing Sheets

LANDSCAPE SPRINKLER HEAD ACCESS DEVICE

RELATED APPLICATIONS

None.

FIELD OF THE INVENTION

The present invention relates generally to a sprinkler head access device and more specifically to a landscape sprinkler head access device.

BACKGROUND OF THE INVENTION

Many Americans spend countless hours maintaining and beautifying their lawns and landscape. As a matter of pride and personal expression, these people manicure their grass, plant and maintain flowers, shrubs, bushes and trees all for the sake of enhancing the aesthetic qualities of their property. One of the most common, but most important duties associated with good looking landscaping is that of proper watering. Those of us who use underground sprinkler systems are aware of how pop-up spray heads provide coverage for large areas of lawns and gardens.

However, one aspect associated with the use of an underground system is that of periodic sprinkler head replacement. This task requires the surrounding dirt area to be dug up which occupies most of the total replacement time, and labor costs should the job be contracted out. Accordingly, there exists a need for a means by which underground irrigation sprinkler heads can be easily replaced without the necessity of digging up the head. The development of the sprinkler head access device fulfills this need.

SUMMARY OF THE INVENTION

To achieve the above and other objectives, the present invention provides for a landscape sprinkler head access device having a sprinkler head producing a spray pattern, an upper cap having a top, a side sleeve housing which has a bottom, a bumper ring disposed on the top of the upper cap to prevent accidental contact with a piece of machinery, a lower cap which is attached to the bottom of the side sleeve housing and, a main body having a first end and a second end.

The cylindrical body is formed by the upper cap, the side sleeve housing and the lower cap are connected together along with the sprinkler head, the main body, the threaded portion, the 90° elbow portion, the first fastener, and an underground sprinkler pipe. The sprinkler head is unimpeded by the upper cap. The upper cap is attached to the side sleeve housing by friction fit which allows for tool-free removal of the upper cap to provide access to the main body for removal, replacement or maintenance. The lower cap forms a cylindrical container when accompanied by the upper cap. The second end includes a threaded portion and a 90° elbow portion. The threaded portion is secured to the lower cap by a first fastener and the 90° elbow portion which is adapted to be connected to a plurality of underground plumbing provided as part of an underground sprinkler system.

The upper cap may be 2½ inches in height. The sprinkler head may be unimpeded by the side sleeve housing. The bumper ring may be attached to the upper cap via a second fastener. The second fastener may be a screw. The bumper ring and the upper cap may be removed to access the main body for removal, replacement or maintenance. The piece of machinery may be a lawn mower. The lower cap may be attached to the bottom of the side sleeve housing via friction fit to prevent accidental dislodgement. The lower cap may be attached to the bottom of the side sleeve housing via adhesive to prevent accidental dislodgement. The upper cap, the side sleeve housing and the lower cap may be made from PVC for strength, resistance to corrosion, and resistance to UV radiation. The first fastener may be a nut. The main body may be positioned at the center of the side sleeve housing to produce an access area around the main body on a 360° basis.

The access area may allow for one or more tools adapted to reach inside the side sleeve housing and remove, replace, or maintain the main body. The access area may be provided by removal of the upper cap without digging or removal of ground. The cylindrical body may be formed by the upper cap, the side sleeve housing and the lower cap connected together along with the sprinkler head, the main body, the threaded portion, the 90° elbow portion, the first fastener, and the underground sprinkler pipe are installed below ground. The sprinkler head and the upper cap may be installed above ground and the side sleeve housing are installed below ground. The landscape sprinkler head access device may provide an enclosure for the conventional lawn and garden sprinkler head to facilitate maintenance, repair and replacement of the conventional lawn and garden sprinkler head without digging it up. The lower cap of the landscape sprinkler head access device may comprise at least one drain hole. The protected area may be selected from the group consisting of a flower bed, a rock garden, or a mulched walkway. The landscape sprinkler head access device may abuts a paved area.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
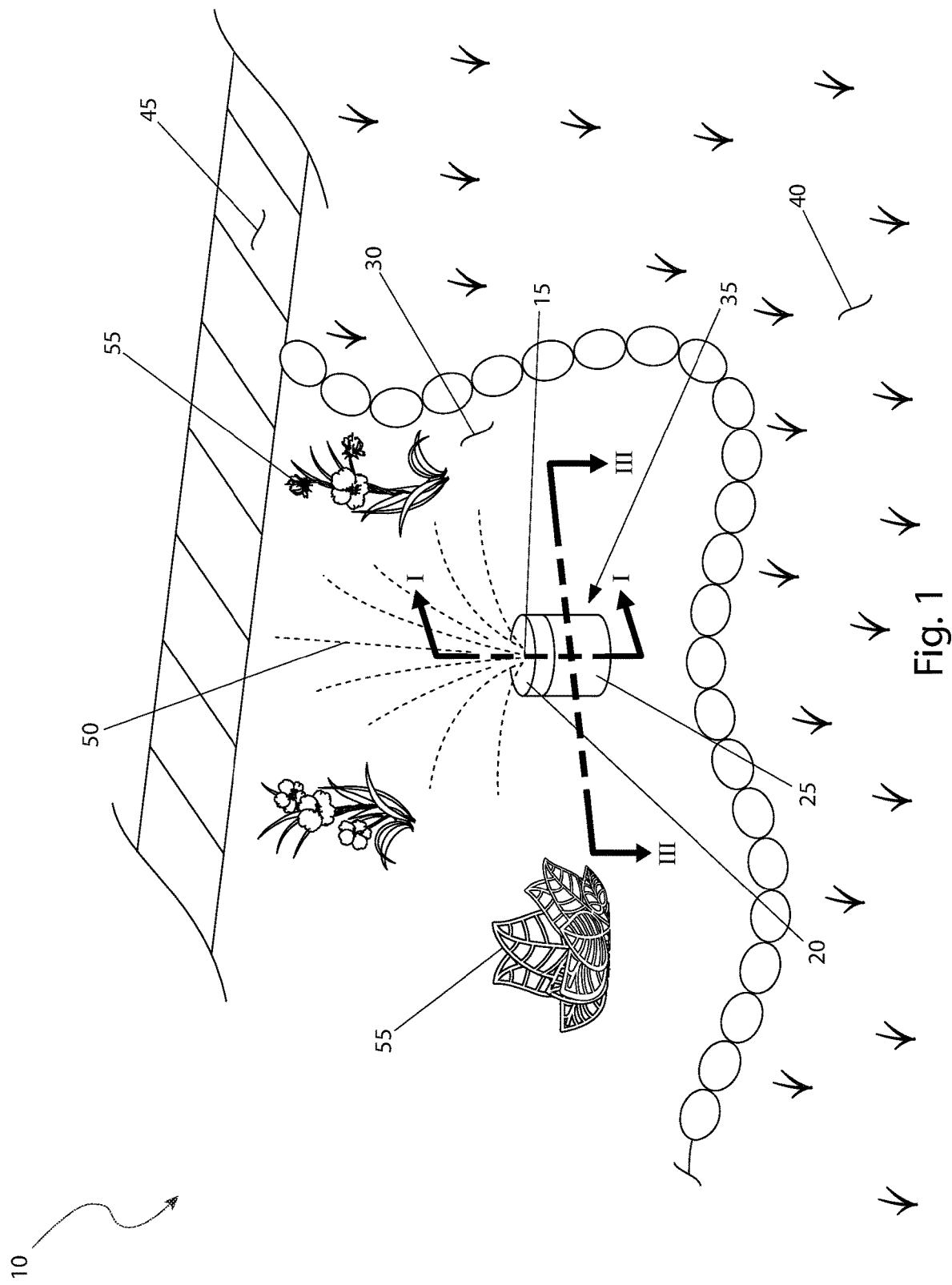
FIG. 1 is a perspective view of the landscape sprinkler head access device, installed in an above ground installation, according to the preferred embodiment of the present invention.

DESCRIPTIVE KEY 10 landscape sprinkler head access device
15 sprinkler head
20 upper cap 25 side sleeve housing
30 protected area
35 grade
40 grass area
45 paved area
50 spray pattern
55 vegetation
60 bumper ring
65 main body
66 main body first end
67 main body second end
70 exposed height "h"
75 lower cap
76 drain hole
80 threaded portion
84 elbow portion
85 first fastener
90 underground plumbing
95 earth
100 second fastener
105 sprinkler head travel path "s"
110 access area

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned those other styles and configuration of the present invention can be easily incorporated into the teachings of the present invention, and only one (1) configuration shall be shown and described for purposes of clarity and disclosure and not by way of limitation of scope. All the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the landscape sprinkler head access device 10, installed in an above ground installation, according to the preferred embodiment of the present invention is disclosed. The landscape sprinkler head access device 10 (herein also described as the "device"), provides an enclosure for a conventional lawn and garden sprinkler head 15 to allow for easy maintenance, repair and replacement of the sprinkler head 15 without digging it up. Visible components of the device 10 include a sprinkler head 15, an upper cap 20, and a side sleeve housing 25. The device 10 is installed in a protected area 30 such as a flower bed, a rock garden, mulched walkway or the like, where conventional sprinkler heads typically protrude above grade 35 by approximately four to six inches (4-6 in.). The protected area 30 may abut a grass area 40 or a paved area 45 as examples of how and where a sprinkler head 15 is typically used. The sprinkler head 15 produces a spray pattern 50 to water vegetation 55 within the protected area 30. The action of the sprinkler head 15 is unimpeded by the upper cap 20 or the side sleeve housing 25. The teachings of the device 10 are envisioned to be usable with all makes and models of underground landscape sprinklers. The depiction of any specific style, make, or model of sprinkler system is not intended to be a limiting factor of the present invention.

Figure 2:
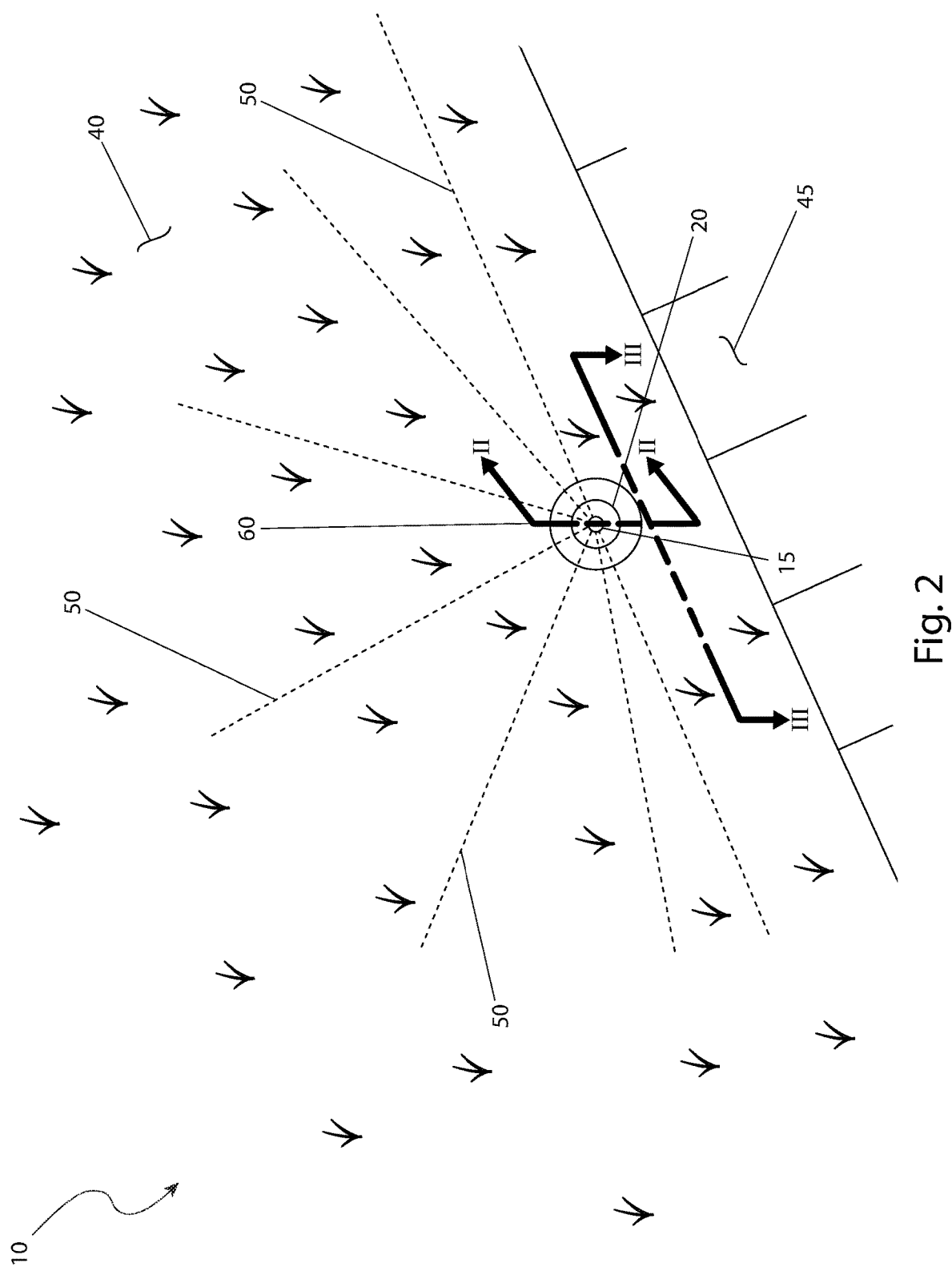
FIG. 2 is a perspective view of the landscape sprinkler head access device, installed in a flush with the ground installation, according to the preferred embodiment of the present installation.

Referring next to FIG. 2, a perspective view of the device 10, installed in a flush with the ground installation, according to the preferred embodiment of the present installation is depicted. The installation provides for the sprinkler head 15 and the upper cap 20 in a visible position. However, the side sleeve housing 25 (as seen in FIG. 1) is below grade and thus not visible. A bumper ring 60 is positioned atop the upper cap 20 and prevents accidental contact with a lawn mower. As aforementioned described, the device 10 is commonly positioned in a grass area 40 and may abut a paved area 45. The exact location and/or area of use of the device 10 is not intended to be a limiting factor of the present invention. The spray pattern 50 from the sprinkler head 15 waters the grass area 40 in an expected manner without interference from the bumper ring 60 or upper cap 20.

Figure 3:
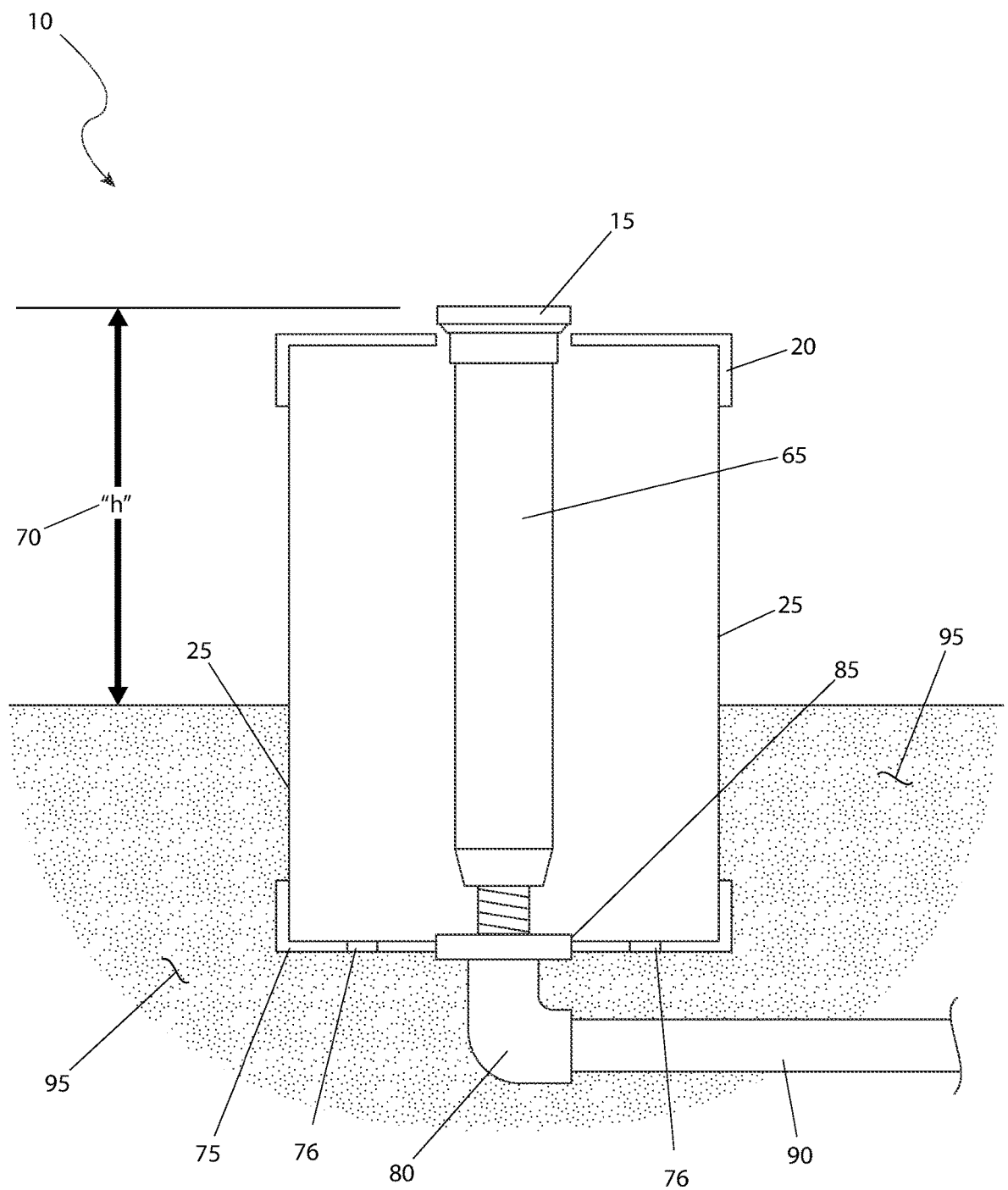
FIG. 3 is a sectional view of the landscape sprinkler head access device, as seen along a Line I-I, as shown in FIG. 1, according to the preferred embodiment of the present invention.

Referring now to FIG. 3, a sectional view of the device 10, as seen along a Line I-I, as shown in FIG. 1, according to the preferred embodiment of the present invention is shown. The sprinkler head 15 is provided with a main body 65 as is customarily expected typically approximately seven inches (7 in.) in height. An exposed height "h" 70 of the upper cap 20 and the sprinkler head 15 above the grade 35 are approximately the same as shown. A lower cap 75 is provided on the bottom of the side sleeve housing 25 and thus forms a cylindrical container when accompanied by the upper cap 20. The lower cap 75 may include at least one (1) drain hole 76, but in an exemplary embodiment would have four (4) drain holes, each approximately one-quarter inch (¼.) in diameter and equidistantly spaced. The main body 65 has a first end 66 and a second end 67. The second end 67 transitions into a threaded portion 80 and a ninety degree (90°) elbow portion 81. The threaded portion 80 is secured to the lower cap 75 by a first fastener 85 such as a nut. The elbow portion 81 is connected to underground plumbing 90 typically provided as part of an underground sprinkler system.

The side sleeve housing 25 may be attached to the lower cap 75 by friction fit or adhesive solvent to prevent accidental dislodgement. The upper cap 20 is attached to the side sleeve housing 25 by friction fit only to allow for tool-free removal of the upper cap 20 to provide access to the main body 65 for removal, replacement or maintenance. The upper cap 20 is approximately two and one-half inches (2½) inches in height. It is envisioned that the upper cap 20, the side sleeve housing 25 and the lower cap 75 would be made from Polyvinyl Chloride (PVC) material for strength, resistance to corrosion, and resistance to ultraviolet (UV) radiation. During initial installation of the device 10, it would be installed partially below the grade 35 in the earth 95 by a digging and backfilling operation.

Figure 4:
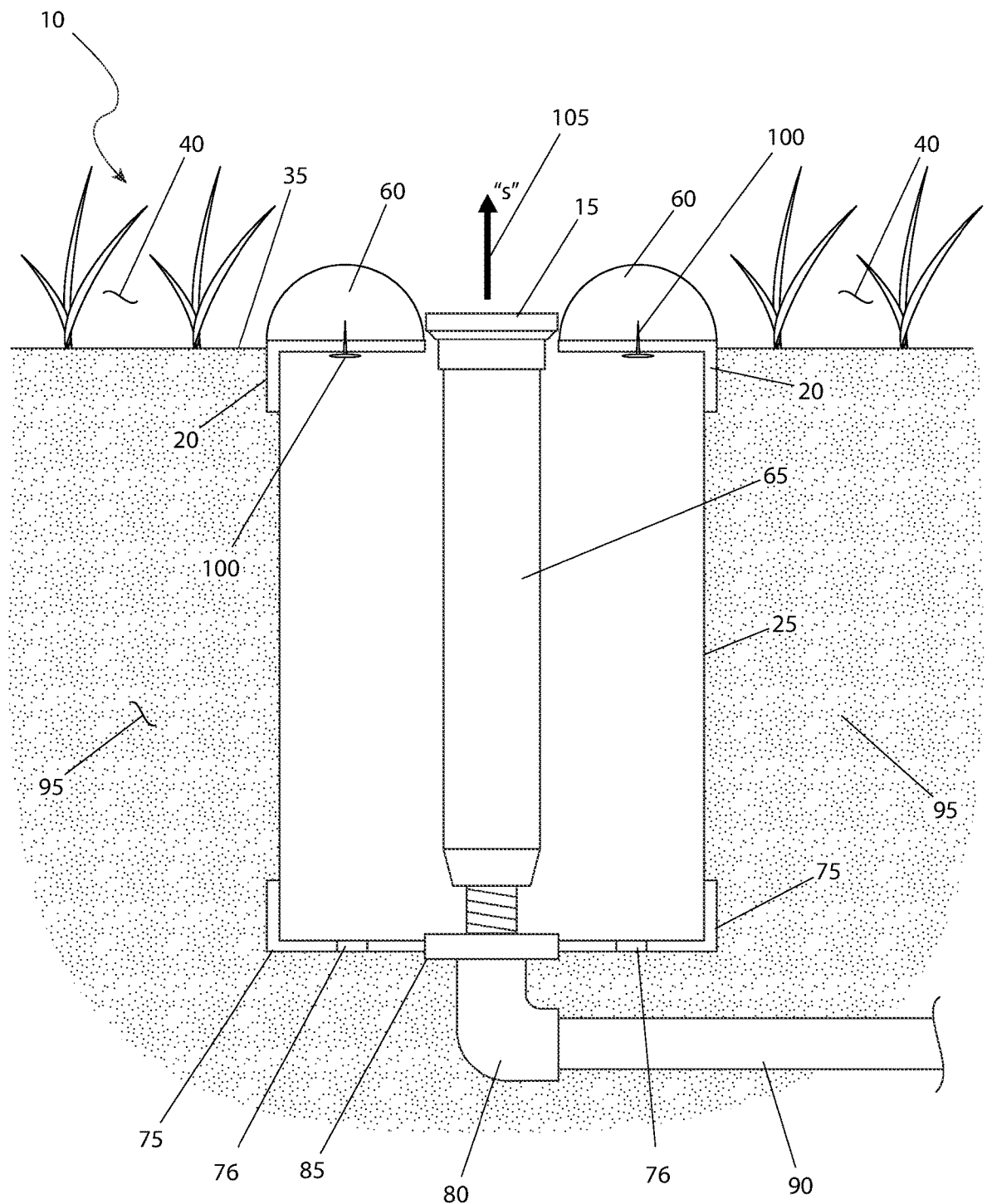
FIG. 4 is a sectional view of the landscape sprinkler head access device, as seen along a Line II-II, as shown in FIG. 2, according to the preferred embodiment of the present invention; and, FIG. 5 is a sectional view of the landscape sprinkler head access device, as seen along a III-III, as shown in both FIG. 1 and FIG. 2, according to the preferred embodiment of the present invention.

Referring next to FIG. 4, a sectional view of the device 10, as seen along a Line II-II, as shown in FIG. 2, according to the preferred embodiment of the present invention is disclosed. As with the installation shown in FIG. 3, the cylindrical body formed by the upper cap 20, the side sleeve housing 25 and the lower cap 75 is connected together along with the sprinkler head 15, the main body 65, the threaded portion 80, the elbow portion 81, the first fastener 85 and the underground sprinkler pipe 90. The aforementioned assembly is then installed below grade 35 in the earth 95 area below the grass area 40. The placement and depth of burial results in the grade 35 being near the same elevation as the top of the upper cap 20. The bumper ring 60 is attached to the upper cap 20 via use of second fastener(s) 100 such as screws. Said arrangement of the bumper ring 60 and the upper cap 20 allows its removal to access the main body 65 for removal, replacement or maintenance. The teachings of the device 10 will work with sprinkler head 15 that remain in a recessed position or those that travel upward along a sprinkler head travel path "s" 105 when activated with water pressure from the underground plumbing 90.

Figure 5:
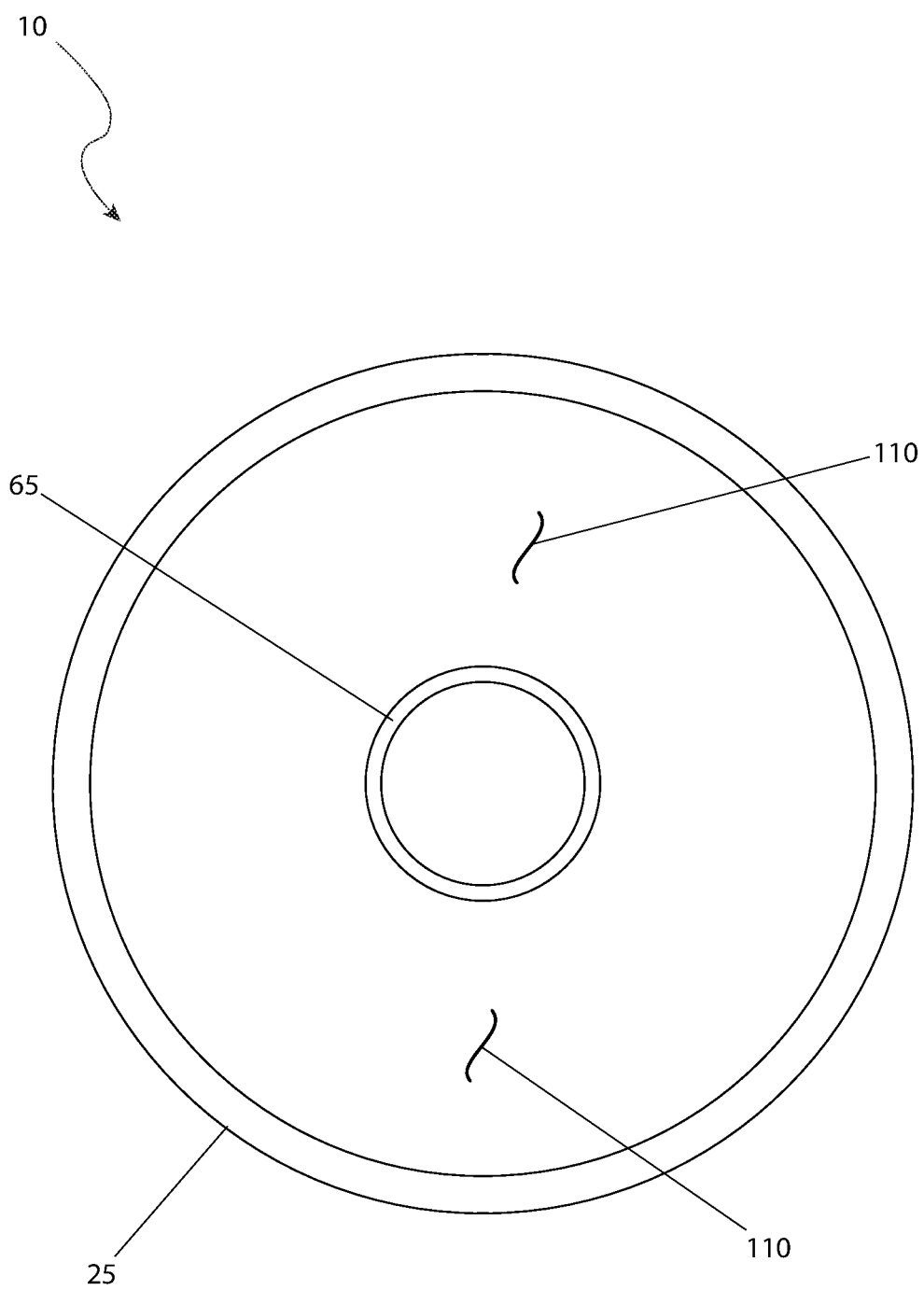

Referring finally to FIG. 5, a sectional view of the device 10, as seen along a Line III-III, as shown in both FIG. 1 and FIG. 2, according to the preferred embodiment of the present invention is depicted. The main body 65 is positioned at the center of the side sleeve housing 25. This configuration produces an access area 110 around the main body 65 on a three-hundred-sixty-degree (360°) basis. This access area 110 allows for tools such as wrenches, pliers, screwdrivers and the like as well as the hands of the user to reach inside the side sleeve housing 25 and remove, replace, or maintain the main body 65. This access is provided by removal of the upper cap 20 without digging or removal of earth 95 as is typically required.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as hardware stores, home improvement stores, mechanical supply houses, mail order and internet supply houses and the like. Special attention would be paid to the use of the above ground style of FIG. 1 or the flush with grade style of FIG. 2.

After procurement and prior to initial utilization, the device 10 would be prepared in the following manner: the threaded portion 80 would be fastened to the lower cap 75 with the use of the first fastener 85; the lower cap 75 would be attached to the side sleeve housing 25 via solvent adhesive or by friction fit; the underground plumbing 90 would be attached to the threaded portion 81 via conventional means; a hole is dug in the earth 95 for either partial burial as shown in FIG. 1 in the case of a protected area 30, or deep enough for a complete (flush) burial as shown in FIG. 2 in the case of a grass area 40; the area around the device 10 would then be backfilled; the main body 65 and the sprinkler head 15 would be attached to the threaded portion 80; and the upper cap 20 (with the bumper ring 60 attached by second fasteners 100 in the case of flush burial) would be applied to the top of the side sleeve housing 25 and secured via friction fit. At this point in time the device 10 is ready for utilization.

During utilization of the device 10, the underground plumbing 90, the main body 65, and the sprinkler head 15 operate in a normal and unimpeded manner. The sprinkler head 15 may or may not pop-up along the sprinkler head travel path "s" 105 during actual utilization thereof.

Should replacement, repair, or maintenance of the sprinkler head 15 and/or main body 65 be required, the user simply lifts up the upper cap 20 to gain access to the main body 65 via the access area 110. Various tools along with the user's hands may fit inside the side sleeve housing 25 to service the main body 65; once complete, the upper cap 20 (with the bumper ring 60 attached by second fasteners 100 in the case of flush burial) would be applied to the top of the side sleeve housing 25 and secured via friction fit to allow use in a cyclical and repeating manner.

The features of the device 10 provide the following applications and benefits: easy repair/replacement of sprinkler head 15 without requiring digging, savings of time and labor costs, usage by both homeowner and professional underground sprinkler contractor, provides for increased protection of sprinkler head 15 and main body 65 resulting in improved performance and longer life, use in both above grade and flush with grade applications; allows use with both static and pop-up sprinkler head 15; and allows for repair/replacement of sprinkler head 15 and/or main body 65 by homeowner or do-it-yourselfer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A landscape sprinkler head access device, consisting of:
a sprinkler head producing a spray pattern;
an upper cap having a top, the sprinkler head is unimpeded by the upper cap;
a side sleeve housing having a bottom;
a bumper ring disposed on the top of the upper cap to prevent accidental contact with a piece of machinery;
a lower cap attached to the bottom of the side sleeve housing, the lower cap forms a cylindrical container when accompanied by the upper cap; and
a main body having a first end and a second end, the second end includes a threaded portion and a 90° elbow portion, the threaded portion is secured to the lower cap by a first fastener and the 90° elbow portion is adapted to be connected to a plurality of underground plumbing provided as part of an underground sprinkler system;
wherein the upper cap is attached to the side sleeve housing by friction fit to allow for tool-free removal of the upper cap to provide access to the main body for removal, replacement, or maintenance;
wherein the main body formed by the upper cap, the side sleeve housing and the lower cap are connected together along with the sprinkler head, the main body, the threaded portion, the 90° elbow portion, the first fastener, and an underground sprinkler pipe;
wherein the bumper ring is attached to the upper cap via a second fastener;
wherein the bumper ring and the upper cap are removed to access the main body for removal, replacement, or maintenance;
wherein the sprinkler head is unimpeded by the side sleeve housing; and
wherein the second fastener is a screw.

2. The landscape sprinkler head access device, according to claim 1, wherein the upper cap is 2-inches in height.

3. The landscape sprinkler head access device, according to claim 1, wherein the piece of machinery is a lawn mower.

4. The landscape sprinkler head access device, according to claim 1, wherein the lower cap is attached to the bottom of the side sleeve housing via friction fit to prevent accidental dislodgement.

5. The landscape sprinkler head access device, according to claim 1, wherein the lower cap is attached to the bottom of the side sleeve housing via adhesive to prevent accidental dislodgement.

6. The landscape sprinkler head access device, according to claim 1, wherein the upper cap, the side sleeve housing and the lower cap is made from PVC for strength, resistance to corrosion, and resistance to UV radiation.

7. The landscape sprinkler head access device, according to claim 1, wherein the first fastener is a nut.

8. The landscape sprinkler head access device, according to claim 1, wherein the main body is positioned at the center of the side sleeve housing to produce an access area around the main body on a 360° basis.

9. The landscape sprinkler head access device, according to claim 8, wherein the access area allows for one or more tools adapted to reach inside the side sleeve housing and remove, replace, or maintain the main body.

10. The landscape sprinkler head access device, according to claim 8, wherein the access area is provided by removal of the upper cap without digging or removal of ground.

11. The landscape sprinkler head access device, according to claim 1, wherein the main body formed by the upper cap, the side sleeve housing and the lower cap connected together along with the sprinkler head, the main body, the threaded portion, the 90° elbow portion, the first fastener, and the underground sprinkler pipe are installed below ground.

12. The landscape sprinkler head access device, according to claim 1, wherein the sprinkler head and the upper cap are installed above ground and the side sleeve housing are installed below ground.

13. The landscape sprinkler head access device, according to claim 1, wherein the landscape sprinkler head access device provides an enclosure for the sprinkler head to facilitate maintenance, repair, and replacement of the conventional lawn and garden sprinkler head without digging it up.

14. The landscape sprinkler head access device, according to claim 1, wherein the lower cap includes at least one drain hole.

15. The landscape sprinkler head access device, according to claim 14, wherein a protected area is selected from the group consisting of a flower bed, a rock garden, or a mulched walkway.

16. The landscape sprinkler head access device, according to claim 1, wherein the landscape sprinkler head access device abuts a paved area.

* * * * *